Patented June 1, 1937

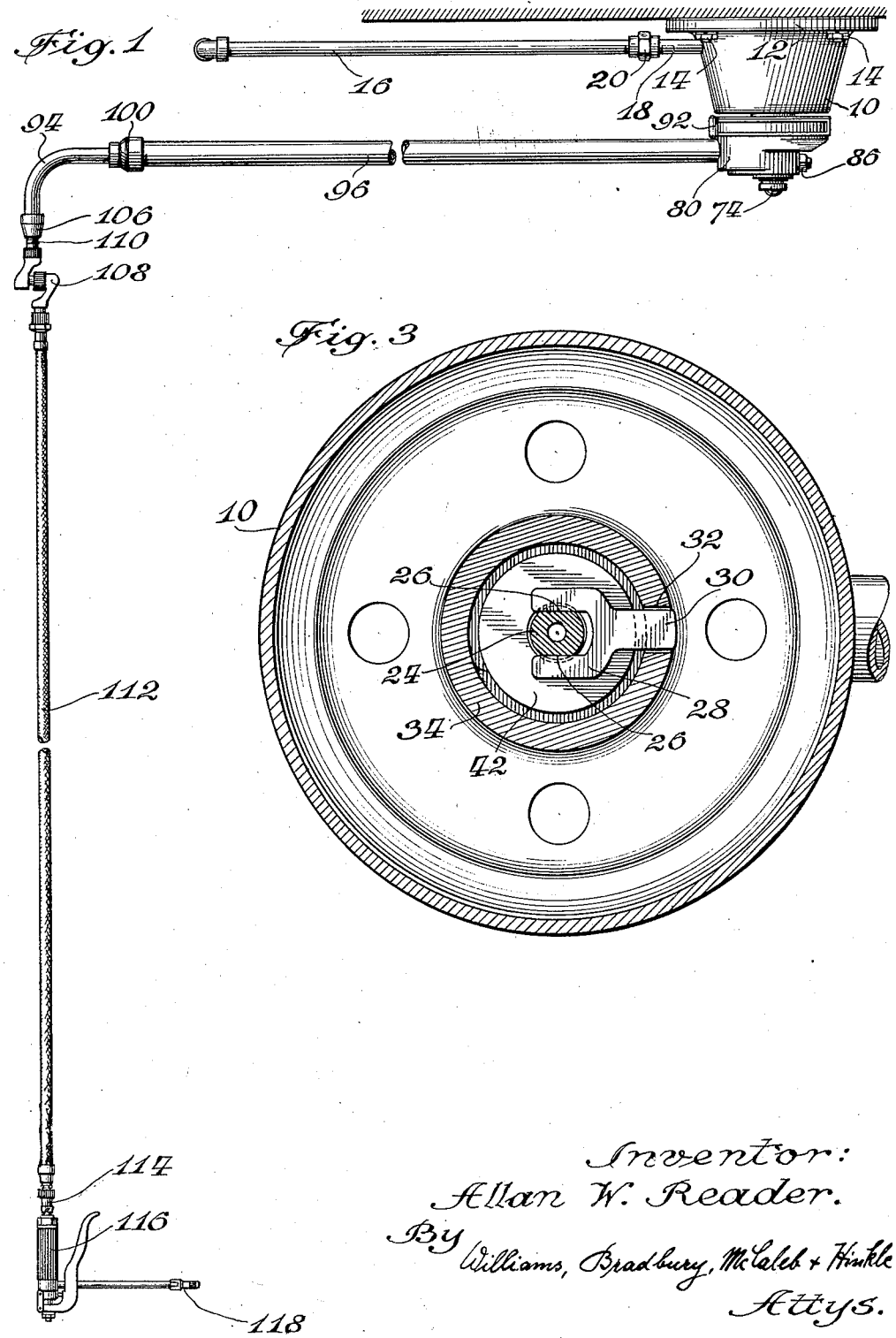

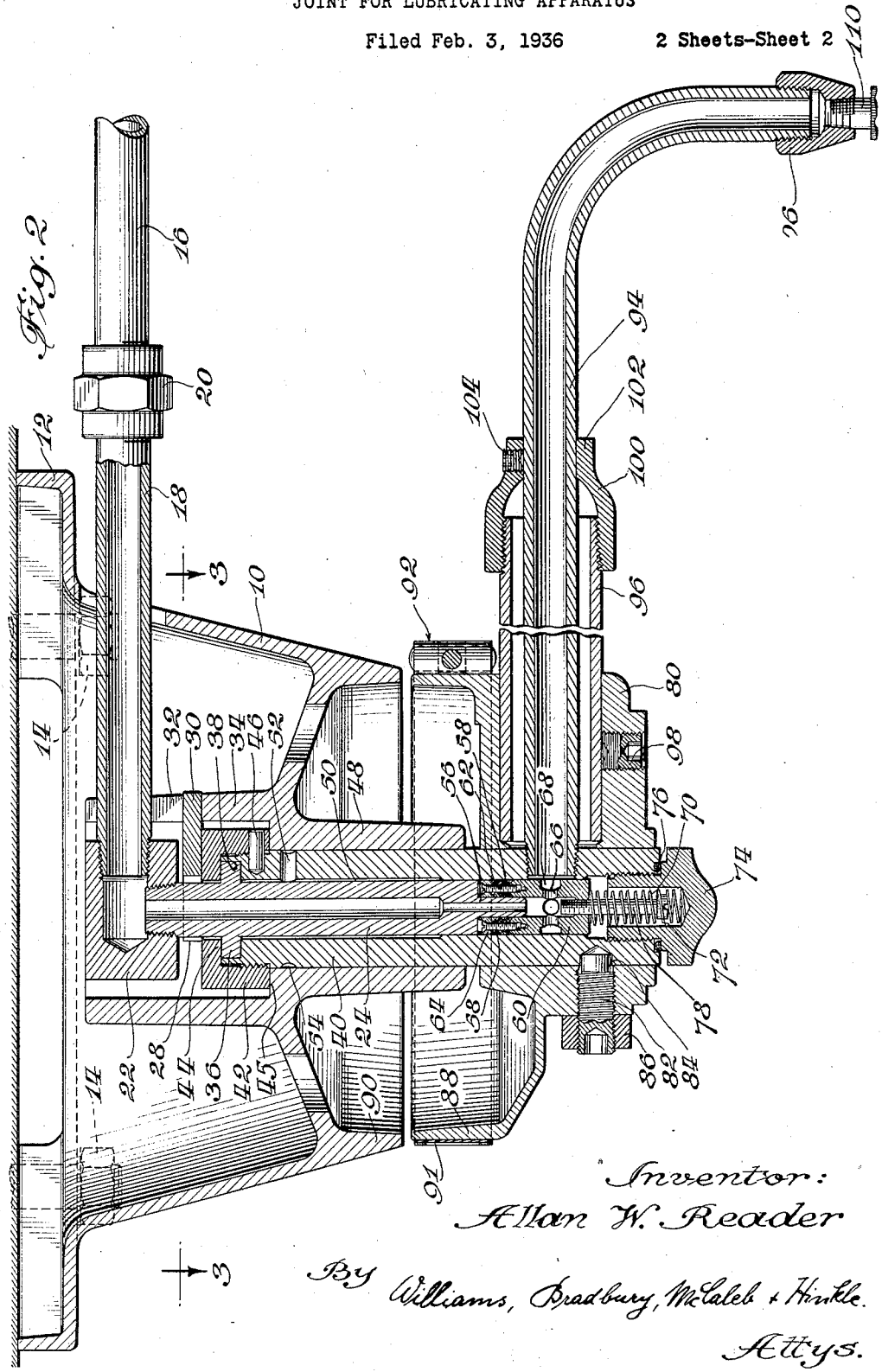

2,082,654

UNITED STATES PATENT OFFICE 2,082,654

JOINT FOR LUBRICATING APPARATUS

Allan Warren Reader, Chicago, Ill., assignor to Stewart-Warner Corporation, Chicago, Ill., a corporation of Virginia Application February 3, 1936, Serial No. 62,217

6 Claims. (Cl. 285—9)

My invention relates generally to lubricating apparatus, and more particularly to overhead swivels for use in high pressure lubricating installations in service stations, garages, and the like.

It is an object of my invention to provide an improved overhead swivel for lubricating installations, which is simple in construction, which has relatively large bearing surfaces, and which will be strong and durable.

Other objects will appear from the following description, reference being had to the accompanying drawings, in which Fig. 1 is an elevation of the overhead swivel of my invention illustrating the manner of its use;

Fig. 2 is a central vertical sectional view of the swivel; and

Fig. 3 is a transverse sectional view thereof taken on the line 3—3 of Fig. 2.

The swivel comprises a body casting 10 having a base flange 12 provided with suitable apertures for bolts 14 by which the casting may be secured to the ceiling of a garage or service station. In the usual installation the swivel will be placed above a rack or lift upon which automobiles to be lubricated may be placed. The lubricant under pressure is supplied to the swivel from the usual high pressure lubricant compressor through a pipe 16 which is connected to the inlet pipe 18 of the swivel by a pipe union 20. The pipe 18 is threaded into an elbow or cap 22 which in turn is threaded upon a swivel member or tubular pintle 24. The pintle has a pair of flattened surfaces 26 beneath the head 22 which are engaged by a forked locking key 28, the latter having an arm 30 resting in a slot 32 formed in a hollow cylindrical portion 34 of the casting 10.

The pintle 24 has a flange 36 which rests in a complementally shaped annular recess 38 formed in the upper end of a spindle 40, the flange 36 being retained in said recess by a flanged nut 42 threaded over the upper end of the spindle 40 and having its flange 44 extending over the flange 36. The nut 42 is locked in position by a pin 46 driven through the nut and projecting into the spindle 40. The lower face of the nut 42 rests upon a thrust bearing surface 45 forming part of the casting 10. The spindle 40 is freely rotatable in a bearing formed by a downwardly extending flange 48 formed integrally with the casting 10. The bore of the spindle 40 which receives the pintle 24 has a suitable lubricant conducting relief 50 which communicates with a drilled hole 52, the latter being in communication with an annular groove 54 formed in the external surface of the spindle 40. Thus the bearing surfaces between the pintle 24 and the spindle 40 and between the latter and the bearing flange 48 are lubricated.

The lower end of the pintle 24 is provided with a projection 56 of reduced diameter, and a seal between this projection and the surface of the bore in the spindle 40 is effected by means of a plurality of annular packing washers 58 which are of inverted V-shape in transverse cross section. The packing washers 58 are secured to a fitting 60 by a plurality of screws 62 which by means of a suitable packing gland 64 hold the packing washers 58 in proper shape and in engagement with the adjacent surfaces of the projection 56 on the bore of the spindle 40.

The fitting 60 is freely rotatable in the bore of the spindle 40 and is provided with a plurality of openings 66 which communicate with an external annular groove 68 to permit escape of lubricant from the internal bore of the fitting. The fitting 60 is normally held in proper sealing position by a compression coil spring 70. The spring 70 is positioned in the bore 72 of a plug 74 which is threaded in and closes the lower end of the bore in the spindle 40, a suitable gasket 76 being provided to prevent leakage of lubricant. A cap screw 78 is threaded into the fitting 60 and provides a convenient handle for the removal of the fitting if and when it should become necessary to renew the packing washers 58.

An outlet pipe supporting casting 80 is secured to the lower end of the spindle by means of a hollow headed set screw 82 which is threaded in the casting and the inner end of which projects into a suitable recess 84 formed in the spindle. The set screw 82 is provided with a lock nut 86. The casting 80 is provided with an upwardly extending flange 88 of relatively large diameter, this flange substantially meeting a downwardly extending flange 90 formed as an integral part of the casting 10 so as to give the swivel assembly a finished appearance. If desired, an ornamental plate or a name plate 91 may be secured around the flange 88 by means of a suitable hinge fitting 92.

A discharge pipe 94 is threaded in the spindle 40 at a point adjacent the groove 68 in the fitting 60 and is supported by a reinforcing pipe 96 which is held in a suitable bore formed in the casting 80 by a hollow headed set screw 98. The outer end of the reinforcing pipe 96 has a fitting 100 threaded thereto, this fitting having a portion 102 of proper internal diameter to receive the discharge pipe 94 and being rigidly secured to the discharge pipe by a set screw 104. The outer end of the discharge pipe 94 has a downwardly extending elbow bend formed therein and its extremity is threaded to receive a reducing bushing 106.

In the normal use of the swivel of my invention a suitable swivel 108 (Fig. 1) will be connected to the reducing bushing 106 by a nipple 110 and the swivel will carry a flexible hose 112 to the outer end of which is secured a coupler 114. Any one of a number of different types of pressure control valves 116 may be connected to the coupler 114, the control valve being provided with a coupler 118 by which a connection may be made with the lubricant receiving fittings upon the automobile to be lubricated.

From the foregoing it will be understood that lubricant under pressure will be supplied through a pipe 18 and will flow through the bore of the pintle 24 and its projection 56 into the bore of the fitting 60. It will flow from the fitting through the ports 66 and annular groove 68 to the discharge pipe 94 and thence through the pipe fittings and swivel 108 and through the discharge hose 112 to the control valve 116 and thence to the part to be lubricated. The escape of lubricant between the pintle 24 and the spindle 40 is prevented by the packing washers 58. As the discharge pipe, together with the spindle 40 are swung about the axis of the pintle 24, the fitting 60 may remain stationary or be rotated with the spindle 40, but in either event will maintain a substantially lubricant-tight seal.

It will be noted that the flange 48 forms a relatively long and solid bearing for the spindle 40, and is thus enabled easily to bear the strain imposed by the weight of the discharge pipe 94 and discharge hose 112 as well as by the pulling force applied to the hose whenever the control valve is moved to lubricate a different part of the automobile. Due to this long bearing the swivel will turn easily without binding. The reinforcing pipe 96 forms a strong rigid support for the discharge pipe 94 and all of the remaining parts are so constructed and arranged as to bear unusual strains to which the swivel may be subjected by rough or careless use of the apparatus. Any lubricant escaping past the packing washers 58 will flow to the bearing surfaces of the spindle 40 and aid in the lubrication of the bearings of this part.

While I have illustrated and described a preferred embodiment of my invention, many modifications may be made without departing from the spirit of the invention and I do not wish to be limited to the precise details set forth but desire to avail myself of all changes within the scope of the appended claims.

Having thus described my invention, what I claim as new and desire to secure by Letters Patent of the United States is:

1. An overhead swivel for delivering fluids under high pressure to a discharge hose, comprising a bearing member constructed and arranged to be secured to an overhead support, a vertical hollow spindle rotatably mounted in said bearing member, a tubular pintle mounted in fixed relation to said bearing member and rotatable within said spindle and having a projection of reduced diameter, an annular packing located between said projection and said spindle, a cap closing the end of said spindle, a discharge pipe secured to said spindle to conduct fluid from the hollow interior thereof and extending horizontally from said spindle.

2. An overhead swivel for lubricating service stations comprising a vertical bearing member constructed and arranged to be secured to an overhead support, a hollow spindle rotatably mounted in said bearing member, a tubular pintle non-rotatably secured to said bearing member and projecting into said spindle, means to prevent relative axial movement between said spindle and said pintle, a packing to prevent escape of lubricant between said pintle and said spindle, a horizontally extending discharge pipe communicating with said spindle, a casting supporting said pipe and secured to said spindle, and a discharge hose secured to the end of said pipe.

3. An overhead swivel for lubricating service stations comprising, a vertical bearing member constructed and arranged to be secured to an overhead support and having a horizontal thrust bearing surface, a hollow spindle rotatable in the vertical bearing of said member, a tubular pintle having a flange and projecting into said hollow spindle, means to prevent rotation of said pintle with respect to said bearing member, a nut threaded over the end of said spindle and having a flange engageable over the flange of said pintle, said nut having an end face cooperable with the thrust bearing surface of said bearing member, means to supply lubricant under pressure to said tubular pintle, sealing means engaging adjacent surfaces of said spindle and of said pintle to prevent leakage of lubricant therebetween, and a discharge pipe secured to said spindle to conduct lubricant therefrom.

4. A swivel connection for high pressure lubricating apparatus, comprising tubular pintle having a lubricant conducting passageway extending therethrough, and having an end portion of reduced diameter, a spindle part having a bore receiving a part of said pintle including said portion of reduced diameter, means to secure said pintle against longitudinal movement with respect to said spindle part, an apertured sealing element carrying annular packing means positioned between said reduced diameter portion of said swivel member and said spindle, a cap closing the end of the bore in said spindle part, and a spring compressed between said cap and said sealing element to hold the packing of the latter in position to seal the joint between said pintle and said spindle.

5. An overhead swivel for delivering fluids under high pressure to a discharge hose, comprising a bearing member constructed and arranged to be secured to an overhead support and having a vertical axis, an axially bored spindle pivotally mounted in said bearing member, a tubular pintle mounted for rotation relative to said spindle and having a part projecting into the bore of said spindle, a packing located between said projection and said spindle, a spring pressed element for holding said packing in sealing position, a horizontally extending discharge pipe secured to said spindle adjacent the lower end of the latter, a casting non-rotatably secured to said spindle, a supporting pipe rigidly secured to said casting and surrounding said discharge pipe, and means for securing the free end of said supporting pipe to said discharge pipe.

6. An overhead swivel for delivering fluids under high pressure to a discharge hose, comprising a bearing member constructed and arranged to be secured to an overhead support, an axially bored spindle rotatably mounted in said bearing member, said spindle having a lubricant conducting passageway formed therein to conduct lubricant to the bearing surfaces of said member, a tubular pintle having a projection extending into the bore of said spindle, an annular packing located between said projection and said spindle, a discharge pipe secured to said spindle and extending horizontally therefrom, a supporting pipe secured to said spindle and surrounding said discharge pipe, and means for securing the outer end of said supporting pipe to said discharge pipe.

ALLAN WARREN READER.